Figure 2:
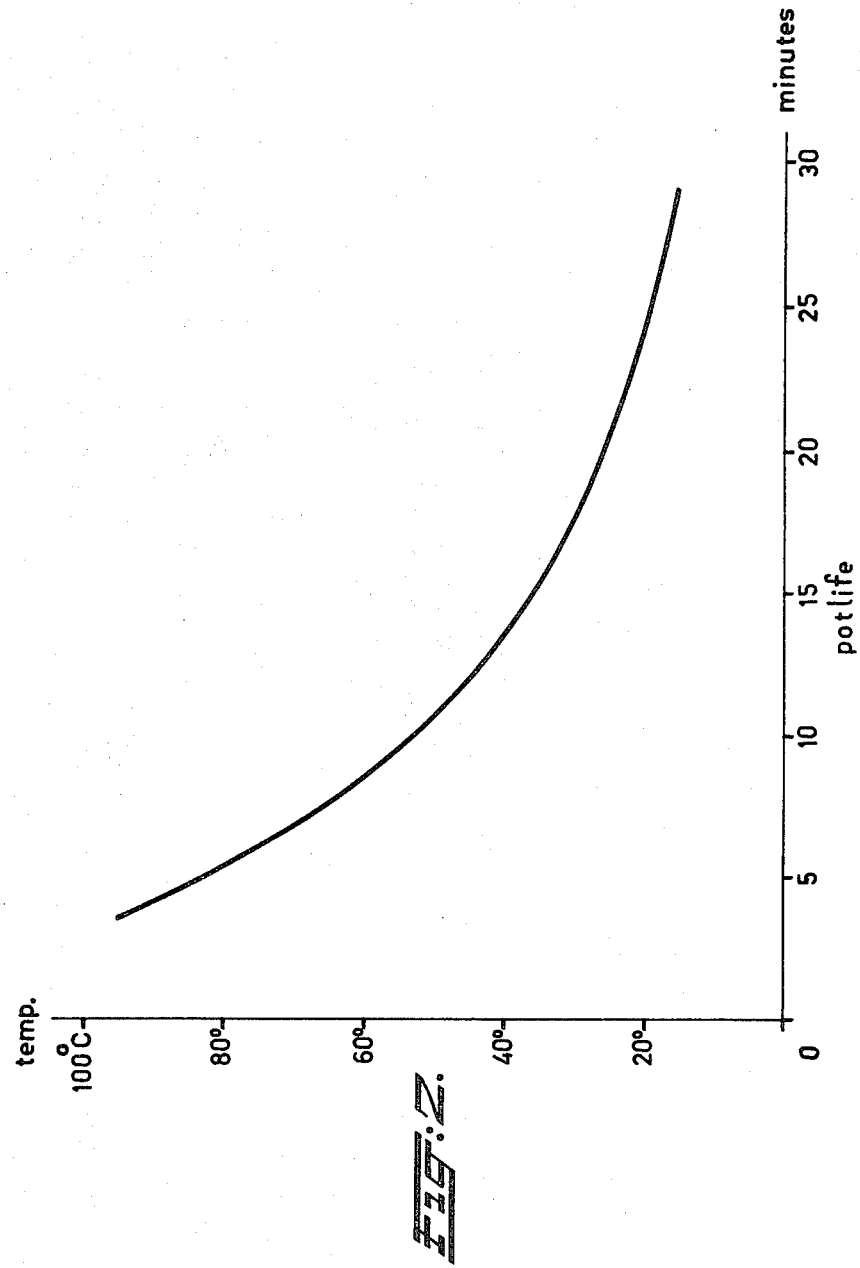

United States Patent

Van Herpt

[15] 3,668,177

[45] June 6, 1972

[54] MOLDING MASSES FOR PRODUCING FIBER REINFORCED PLASTIC ARTICLES, METHODS OF PREPARING SUCH MOLDING MASSES, AND ARTICLES PRODUCED THEREFROM

[72] Inventor: Cornelis Hendrikus Jozephus Van Herpt, Helmond, Netherlands

[73] Assignee: N. V. Koninklijke, Helmond, Netherlands

[22] Filed: May 18, 1970

[21] Appl. No.: 37,456

Related U.S. Application Data

[63] Continuation of Ser. No. 723,225, Apr. 22, 1968, abandoned, which is a continuation-in-part of Ser. No. 512,141, Dec. 7, 1965, abandoned, which is a continuation-in-part of Ser. No. 304,462, Aug. 26, 1963, abandoned.

[30] Foreign Application Priority Data

| Sept. 7, 1962 | Netherlands | 283020 |
| Aug. 8, 1963 | Netherlands | 282776 |
| Mar. 9, 1965 | Netherlands | 6502959 |

[52] U.S. Cl. .................................... 260/37 EP, 260/40 R
[51] Int. Cl. .................................................. C08g 51/04
[58] Field of Search ................. 260/37 R, 37 EP; 259/10

[56] References Cited

UNITED STATES PATENTS 2,819,243  9/1958  Baker ........................... 260/40
2,819,243  1/1958  Baker ........................... 260/40

FOREIGN PATENTS OR APPLICATIONS 64,634  4/1943  Norway ........................... 259/10
64,634  4/1943  Norway ........................... 259/10

*Primary Examiner*—Morris Liebman
*Assistant Examiner*—S. M. Person
*Attorney*—Arnold Robinson

[57] ABSTRACT

A molding mass is obtained by adding to a thermosetting resin, for example, a polyester or epoxy resin, in liquid state, a particulate filler material, such as an asbestos or quartz powder, and bundled together reinforcing fibers of inorganic material, such as, glass fibers, which fibers have a diameter in the range from 0.01 to 0.02 mm and a length to diameter ratio between approximately 100 and 500, with the particle size of the filler material varying between 5 and 50$\mu$ in direct proportion to the variation of the length to diameter ratio, and subjecting the molding mass to a continuous mixing and kneading action at a localized region and removing one-fourth to one-seventh of the mass transported to the outlet of this region by means of a conveying ribbon and recycling the removed mass to the localized region, the rest of the transported mass being passed out of the mixing zone, thereby to avoid a substantial temperature rise in the mass while the mixing and kneading is continued until the mass has a density of 1.5 and at least approximately 80 percent of the bundled together fibers are pulled apart into individual fibers dispersed uniformly throughout the mass.

2 Claims, 3 Drawing Figures

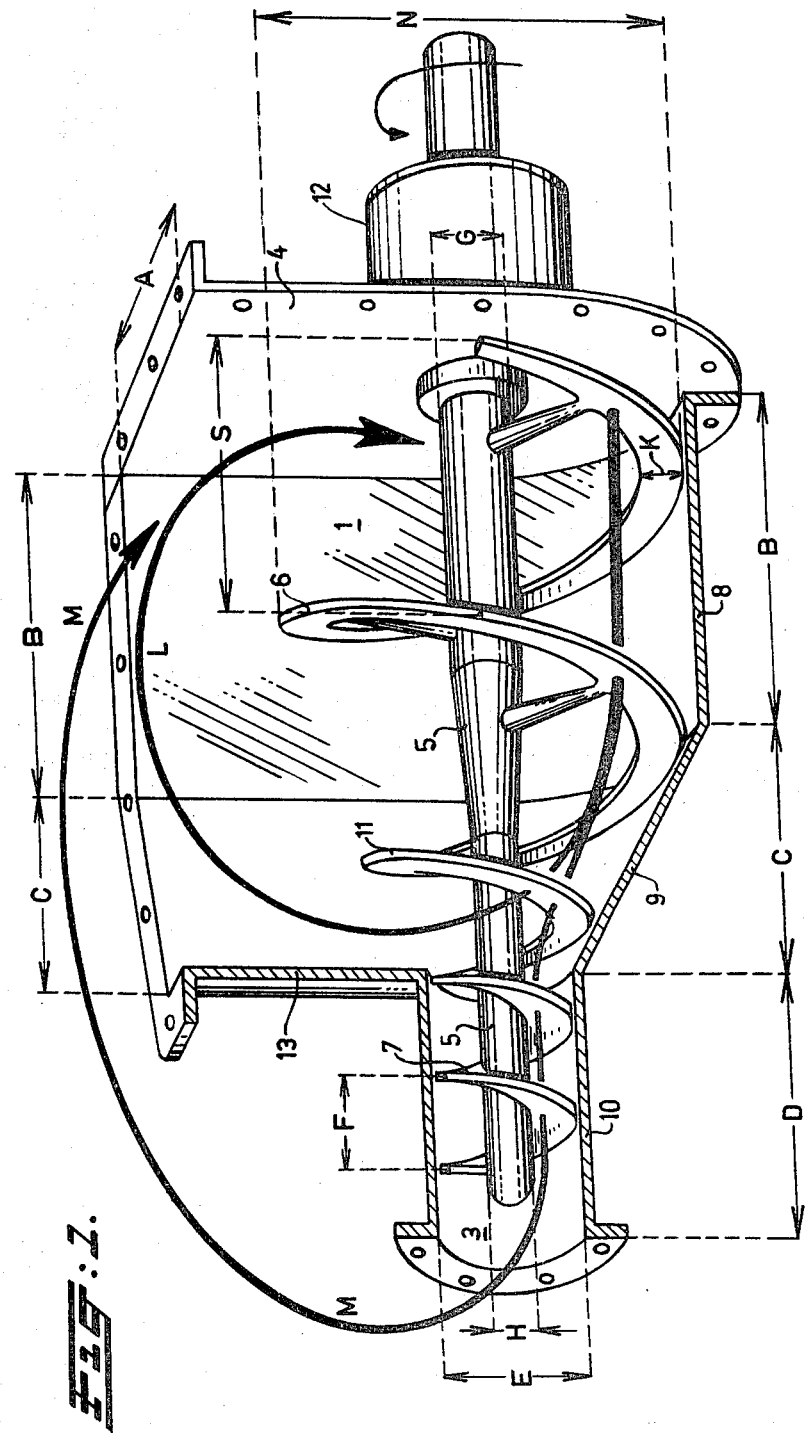

MOLDING MASSES FOR PRODUCING FIBER REINFORCED PLASTIC ARTICLES, METHODS OF PREPARING SUCH MOLDING MASSES, AND ARTICLES PRODUCED THEREFROM

This application is a continuation of my application Ser. No. 723,225, filed Apr. 22, 1968, which was a continuation-in-part of application Ser. No. 512,141, filed Dec. 7, 1965, which was a continuation-in-part of application Ser. No. 304,462, filed Aug. 26, 1963, all now abandoned.

It has been known to provide a molding mass composed of a mixture of a thermosetting resin, such as, polyester or epoxy resins, and mineral reinforcing fibers and fillers, which mass remains kneadable or plastic for some time after the mixing together of its constituents and is thereafter solidified by exposure to a considerably higher temperature.

However, molding masses constituted as above do not often produce satisfactory reinforced plastic articles, particularly when the latter are formed by injection molding of the mass. Defects in the molded articles are especially found to exist when the reinforcing fibers are introduced in to the molding mixture in the form of bundles of adhering glass fibers which resist separation into individual fibers that can be uniformly distributed throughout the molding mass.

The presence of non-homogeneously distributed fibers can easily give rise to the formation of cracks in the molded articles and to corrosion by chemical agents, especially after surfaces of these articles have been machined. On machining these surfaces, the glass fiber bundles become exposed and acids or other corrosive chemical agents may easily penetrate therealong into the article giving rise to bad corrosion.

It is well known in the art that a thermosetting resin together with a curing agent will cure after a given time which depends on the temperature of the mass. Obviously the setting time is low for a high temperature and high for a low temperature. The setting times can be derived from FIG. 2 which shows the relationship between temperature of the molding mass and the potlife (or setting time). In order to obtain a suitable mass the mixing procedure should be effected in a relative short period without increasing the temperature to a high value.

Although it has been suggested to avoid the above disadvantages by suitable selection of the diameter of the fibers to be used and by maintaining a definite length/diameter ratio of each individual fiber thread, such measures are not alone sufficient to prevent non-homogeneous distribution of the glass fibers.

It is now an object of the invention to provide a method whereby an injection molding mass is obtained in which the individual fibers are very homogeneously distributed, so as to avoid cracking and corrosion of articles formed therefrom, even by injection molding.

According to the invention a selected quantity of fillers is added to a thermosetting resin in a liquid condition to provide a viscosity thereof that is sufficiently high to permit the bundles of reinforcing fibers, corresponding to at least 35 percent by weight of the resin, to be pulled apart into individual fibers by a mixing and kneading action, and in that such mixing and kneading action is applied continuously at only a portion of the total mass which is circulated so as to be repeatedly and intermittently subjected to such action, whereby the temperature of the mass, during mixing and kneading, does not rise considerably even in the absence of external cooling or the introduction of cooling agents into the mass.

The avoidance of an excessive temperature rise in the mass during the mixing and kneading thereof in the manner described above is preferred over the use of external cooling or the introduction of cooling agents into the mass in that the cooling effect of external cooling or cooling agents can never uniformly affect the mass with the result that locally too high temperatures are produced during the mixing process. Such local hot spots give rise to partial polymerization or prepolymerization of the resin, so that portions of the mass have too high a viscosity and, owing thereto, there is a non-uniform distribution of the individual glass- or reinforcing fibers or the like in the resin mass.

The mixing and kneading action according to the invention is continued until at least 80 percent of the fibers are separated from each other.

A sufficiently high viscosity of the mixture of liquid resin and filler for separating the bundles of reinforcing fibers by the mixing and kneading action is obtained when the amount of filler is between approximately 80 and 150 percent, by weight, of the amount of resin.

In the case of a mass for injection molding of articles, the amount of filler is preferably 125 percent by weight, of the amount of polyester resin, and preferably 103 percent, by weight, of the amount of epoxy resin.

Heretofore, the reinforcing fibers used in injection molding masses have been in the form of so-called shopped strands, that is, bundles each consisting of a plurality of, for example, 100, fibers which stick together by means of their adhesive properties. Usually such reinforcing fibers have a length of 6 mm and a diameter of substantially 0.25 mm, so that the ratio between the length and the diameter, that is, the so-called l/d ratio, for each of these pieces is approximately 25. It has been found, quite surprisingly, that the l/d ratio of the reinforcing fibers in the injection molding mass is of great importance with respect to the possibility of forming an injection molding mass of high quality and especially one affording great bending strength to articles manufactured of this injection molding mass.

In order to obtain the desired results, it has been found that the so-called l/d ratio for each reinforcing fiber has to be predetermined so that this ratio will vary between 100 and 500, preferably in a direct proportional ratio to the dimensions of the particles forming the filler materials, which dimensions can vary from 5 to 50$\mu$. Further, at least 80 percent and preferably at least 90 percent, of the quantity of reinforcing pieces mixed into the injection molding mass should be single fibers having a diameter varying between 0.01 and 0.02 mm. When employing the aforementioned ratios, an injection molding mass is obtained in which each fiber is embedded completely in the base resin, and the fibers are spread or oriented in all possible directions in the mass. Further, such injection molding mass is capable of filling the injection molds even when the latter have narrow passages or channels and the reinforcing fibers remain uniformly dispersed throughout the mass and do not collect or jam in the narrow passages of the mold.

In accordance with this invention, the reinforcing fibers included in an injection molding mass preferably have a length that is less than the minimum dimensions of the articles to be molded therefrom at the narrowest cross-sections of the mold cavity.

The mixing and kneading process should be performed in such a way that one-fourth to one-seventh of the mass conveyed to the oultet is removed and recycled to the open mixing zone, the remainder of the transported material being moved out of the mixing and kneading area. This results in tearing forces, whereby the bundles of inorganic fibers can be torn apart by relatively small forces applied in the mixing and kneading area or zone.

A molding mass having the previously described characteristics in accordance with the invention is preferably produced by introducing required quantities of a base resin, filler materials and reinforcing fibers into the mixing chamber of a mixing device; rotating a mixing screw consisting of a conveying band wound spirally about a shaft and mounted in the chamber of the mixing device; the rotated mixing screw kneading and mixing the materials introduced into the mixing chamber to form an injection molding mass and, at the same time, driving the mixed mass continuously forward over an upwardly inclined portion of the bottom of the chamber toward an opening leading into a tubular outlet piece integral with the mixing chamber; rotating a conveying screw mounted inside the tubular outlet piece and having a capacity adapted to transport to the outside only one-fourth to one-seventh part of the mass forced continuously to the mouth of the outlet so that only part of the arriving mass is discharged through the tubular outlet, whereas the rest is forced in an upward direction in the mixing chamber and returns in a substantially horizontal plane above the mixing screw, that is, out of the mixing and kneading area, to the inlet end of the latter where it is again subjected to the kneading and mixing process; and carrying on the whole process continuously until all the materials introduced into the mixing chamber are formed into an injection molding mass having separated reinforcing fibers and passed out of the mixing device through the outlet piece.

Since only a part one-fourth to one-seventh of the mass arriving at the mouth of the tubular outlet is discharged therethrough and the remainder of such mass is recirculated out of the mixing and kneading area, such recirculated mass is allowed to cool and the mass in the mixing chamber does not undergo a considerable rise in temperature. Further, by reason of the presence of the stated amounts of fillers in the molding mass, the viscosity of the latter is sufficient to cause shearing forces to arise for easily tearing apart the bundles of reinforcing fibers, particularly when part of the mixed mass is removed from the mixing and kneading area as aforesaid.

The mixing process embodying this invention is preferably performed in a mixer of the type illustrated in the drawing which shows a perspective view thereof, partly broken away and in section.

Each mixer consists of a mixing vessel 1 and opening, at one end, into an outlet duct 3. A helical ribbon 6 is fixedly secured to a shaft 5 which, at one end, is rotatably supported in an end wall 4 of the mixing vessel 1. The part of the shaft extending in the duct 3 has a conveyor worm 7 thereon. The bottom 8 of the mixing vessel 1 merges through a gently upwardly inclined portion 9 into the bottom 10 of the duct 3. The helical ribbon 6 is connected through a similarly tapering portion 11 with the conveyor worm 7. The construction is such that the tapering portion 11 conforms to the gently upwardly inclined portion 9 of the bottom of the mixing vessel 1. Disposed at the outside of the mixing vessel 1 and connected to the shaft 5 is a transmission 12 which is driven by an electric motor (not shown) accommodated in a housing which is provided with cooling ribs. The endwall 13 must be substantially vertical. The mixer employed has the following dimensions. The width A of the open mixing vessel 1 is 180 mm, the length B is 230 mm. The length C at the location of the bridge piece is 70 mm.

The length D of the outlet 3 is 80 mm, while the inner diameter E of the outlet is 75 mm. The pitch F of the conveyor worm 7 is 50 mm, while the pitch S of the ribbon 6 has a value of 140 mm. The shaft 5 has a diameter G of 50 mm and at the location of the outlet is reduced to H 30 mm. The ribbon 6 has a width K of 8 mm. The diameter N of ribbon 7 is 180 mm, e.g. glass fiber bundles, required in order to prepare the ejection molding mass are introduced into the mixing vessel of the mixer, whereupon due to the rotation of the shaft 5 mixing is started. Under these circumstances the ribbon 6 with the bridge piece 1 conveys in the direction of the outlet 3. The conveyor worm 7 provided in the outlet 3 can however only take along one-fifth part of the mass supplied to the outlet 3 and discharge same from the mixer. The greater part, four-fifths of the supplied material is, however, passed in the direction of the arrow P and outside of the mixing and kneading area.

The tapering portion 11 of the mixing and kneading member in cooperation with the inclined portion 9 of the bottom of the mixing vessel 1 prevents the mass from caking at the entrance or mouth of the duct 3. Due to the exerted forces, a plucking action is produced on the glass fiber bundles on stirring the mass, with the result that individual glass fibers are obtained. It is obvious that during the mixing process the mass is repeatedly moved out of the mixing and kneading area and is also repeatedly subjected to the mixing and kneading operation. The part discharged from the mixer is recycled to the mixer (arrow M). The ratio between the discharged material and the material being transported to the outlet of the mixing zone is called recycle ration.

In the following specific examples, Examples 1, 2 and 10 illustrate difficulties encountered when proportions of the injection molding mass do not conform to ranges according to this invention, the other examples are illustrative of the invention.

EXAMPLE 1

Into a mixing device as described hereinbefore are introduced 1 kg of polyester resin and 1 kg of asbestos filler with a particle size of approximately $50\mu$. After mixing for 10 min with care in the device and discharging one-fifth of the mass moved to the outlet and recycling said part of the mass to the mixer while adding a suitable catalyst, such as, 2 percent of benzoyl peroxide, a number of test bars having a flexural strength of 458 kg/cm$^2$ are made. Owing to the lack of reinforcing fibers these bars are weak, indicating that the molding mass cannot be applied to the manufacture of articles that need to be of high strength, such as pump housings and the like.

EXAMPLE 2

Introduced into the device, as in Example 1, are 1 kg of polyester resin and 0.45 kg of glass fibers, the latter in the shape of fiber bundles with a fiber length of 6 mm and an individual fiber diameter of 0.015 mm. The catalyst, as mentioned in Example 1 is added while mixing is performed for 15 minutes. (recycle ratio 1 : 5). Thereupon the test bars are made which, under circumstances analogous to those of Example 1, appeared to have a flexural strength of 605. On examination, the glass fibers are seen to be incompletely distributed owing to which the mass is neither fit for the manufacture of injection molded articles.

EXAMPLE 3

In accordance with this invention 1 kg of polyester resin 1.25 kg of asbestos (density 1.4) with a particle size of 50 microns and 350 grams of shopped strands of glass fibers with a length of 6 mm are continuously introduced into the mixer. After admixing 2 percent benzoylperoxide (calculated on the resin) the mixer is started. The product discharged by way of the outlet 3 (recycle ratio of 1 : 5) is again manually introduced into the mixing vessel until the density of the mass amounts to 1.3 and the temperature to 33°, (after 8 minutes mixing). Test bars can be made of this material having a flexural strength of 1,120. The same values were attained when the mass was mixed to a volume weight of 1.5 and a temperature of 36° C, (after 11 min mixing). The fibers are extraordinarily well distributed in this mass.

If a mixer is applied with a discharge ratio or recycle ratio of 1 : 7 the temperature on obtaining a density of 1.3 has already risen to 52° C whereby owing to the increase of the viscosity during mixing for 8 minutes the fibers are not evenly distributed. The flexural strength amounts only to 1,000 kg/cm$^2$.

A mixer with a discharge ratio of 1 : 3 has the drawback that no adequate mixing is achieved and in this way neither the required volume weight of 1.3 nor a proper distribution of the fibers can be achieved after 25 minutes. The temperature of the mass amounts to 30° C. Test bars have a flexural length of 760 kg/cm$^2$.

EXAMPLE 4 a. Introduced into a mixer of the aforementioned type are 1 kg epoxy resin, 0.50 kg asbestos with a particle size of 50 microns and 0.35 kg glass fibers in bundles with a length of 6 mm and a diameter of 0.015 mm. After adding a mixture of 65 parts of D.D.M. hardener and 32 parts of M.P.D. hardener, the mixture amounting to 20 percent of the total quantity of resin, mixing is effected at a discharge ratio of 1 : 5 while the discharged material is recycled. After having obtained a density of 1.4 after 10 minutes and a temperature of 38° C test bars are made, the flexural strength of said bars range from 1,420 to 1,450. This mass is satisfactory but not suitable for injection molding as the distribution of glass is only 80 percent and the working properties bad.

b. On mixing with a discharge ratio of 1 : 3 the glass fibers are not evenly distributed after mixing for 25 minutes and in that case test bars with a flexural strength of 780 are obtained from a mass with a temperature of 30° C. The fibers are not evenly distributed.

c. On mixing at a discharge ratio of 1 : 7 the glass fiber bundles are not completely drawn apart and after mixing to a volume weight of 1.4 a mass with a temperature of 69° C is obtained which immediately sets after mixing. Test bars have a flexural strength of not more than 950 kg/cm² and the worked surfaces have many pores owing to the bad distribution of the fibers.

EXAMPLE 5

In the event that the conditions of Example 4a are maintained and only the lengths of the reinforcing fibers are varied, the following results are obtained:

| Fiber Length | of Test Bars |
| --- | --- |
| 3 mm. | 880 |
| 6 mm. | 1450 |
| 8 mm. | 1300 |
| 12 mm. | 1280 |

EXAMPLE 6

When the glass fibers are replaced by brayed glass made up of 56 parts of glass powder and 44 parts of glass fibers, the lengths of the powder particles and fibers being in the range of 0.4 and 3.0 mm., for each 100 parts, by weight, of resin, a $\delta_b$ of 830 was found when the aforementioned hardeners were employed.

EXAMPLE 7 a. A very good mixture has been obtained from 100 parts of epoxy resin, 32 parts of bundles of glass fibers having a length of 6 mm and a diameter of 0.015 mm average, and 103 parts of asbestos powder with a particle size of 50μ, to which mixture 20 parts of a composition of 65 parts of DDM hardener and 32 parts of MPD hardener were added. After mixing for 10 minutes with a recycle ratio of 1 : 5 the finally obtained mass is a flaky one which, however, can be suitably worked up in the injection molding process. The density is 1.45 and the temperature 40° C. 98 percent of the glass fibers are divided as single fibers after mixing for 8 min, the temperature of the mass being 42° C. The flexural strength amounts to 1,300 kg/cm². Similar results are obtained with 30 parts of bundles of glass fibers but the flexural strength is 20 percent lower.

b. At a recycle ratio of 1 : 7 the final mass had a temperature of 68° C at a volume weight of 1.5 and a mixing time of 10 min. The fibers are only for 76 percent divided into single fibers. At a volume weight of 1.3 the temperature is already 65° C and the fiber distribution comprises about 72 percent single fibers. The flexural strength is 1,100.

c. At a discharge ratio of 1 : 3 only 50 percent of the fibers in the final mass, are divided into single fibers after mixing for 25 minutes. The end temperature being 36° C.

d. In this example the method according to Example 7a was continuously performed. For that purpose three mixers were disposed above one another in such a way that the outlet of the first mixer is situated over the mixing vessel of the second mixer, while the outlet of the second mixer is situated over the mixing vessel of the third mixer. At first the mixing vessel of the first mixer is filled with 1 kg epoxy resin (Bayer), 3.2 kg glass fibers in bundles, 1.03 kg asbestos powder of 50 microns. With a recycle ratio of 1 : 5 the end temperature of the mass is 42° C. Then the first mixer is started and reagents added in the amount in order to have a constant quantity of materials in the first mixer. After having filled the second mixer, this mixer is started and so on. The mass discharged from the third mixer is recycled to the first mixer, the supply of reagents being controlled in order to have a constant quantity in the first mixer, until an amount corresponding to the volume of the first mass has been recycled. Further recycling is not necessary.

e. The quality of injection molded articles obtained from the injection molding mass having epoxy resin as its base, for example, as in Examples 3 and 7 above, is shown by immersing test bars molded of such mass in 30 percent muriatic acid for a period of 10 hours. The test bars have an initial flexural strength of 1,120 – 1,400 kg/cm², and the change in flexural strength, at the conclusion of the treatment, is dependent on the temperature of the muriatic acid, as follows:

| Flexural strength after 10.000 hours (kg/cm²) | | Temperature of muriatic acid ° C. |
| --- | --- | --- |
| Example 4 | Example 7 | |
| 1120 | 1400 | 25 |
| 980 | 1310 | 70 |
| 760 | 1050 | 90 |

Further, the test bars were found to undergo the following small increases in weight after immersion in muriatic acid at various temperatures:

| Time of treatment | Temperature of muriatic acid | Weight increase |
| --- | --- | --- |
| 10.000 hrs | 25° C. | 0.1% |
| 7.000 hrs | 70° C. | 1.0% |
| 1.000 hrs | 90° C. | 1.0% |

EXAMPLE 8

Operating as in Example 7, but using glass fibers with a length of 14 mm and a diameter of 0.015 mm (that is, a ratio of length to diameter of 930), the resulting test bars are found to have a bending strength of 800 kg/cm². This mass is not suitable for manufacturing articles by injection molding and demonstrates the necessity of maintaining a l/d ratio in the range between 100 and 500.

EXAMPLE 9

A reinforced plastic article having a minimum cross-sectional dimension of 3 mm, is injection molded from the mass produced according to Example 3 or 4 (that is, having a fiber length of 6 mm.). The molded article is found to have many cracks in the region of its narrowest cross-section. Such cracks are avoided when the molding mass is formed with glass fibers having a length of 3 mm that is, not greater than the minimum cross-sectional dimension of the molded article.

Further, the flexural strength of the article molded of a mass having reinforcing fibers of 3 mm length is increased approximately 20 percent when the filler material, which has a particle size of 50 microns in Example 3 or 4 is replaced by a filler material of 20 microns particle size. This demonstrates the advantage of varying the l/d ratio of the glass fibers in proportion to the particle size of the filler material, as in accordance with this invention.

EXAMPLE 10

A very good mixture has been obtained from 100 parts by weight of polyester resin, 100 parts by weight of asbestos powder with a particles size of approximately 50 microns, 30 parts by weight of glass fibers having a length of 6 mm and an average diameter of 0.015 mm, and 25 parts, by weight of quartz powder of a particle size of 30 microns. After adding 2 percent of benzoyl peroxide as a catalyst this mass is mixed with a recycle ratio of 1 : 5. The finally obtained mass is very suitable for injection molding. Test bars have a flexural strength of 1,300.

EXAMPLE 11

Introduced into the mixer, as in Example 1 are 1 kg of a phenol formaldehyde resin (Novolak), 1 ¾ kg of asbestos with a particle size of 50 microns and 350 grams of glass fibers with a length of 6 mm and an average diameter of 0.015 mm. After adding an appropriate amount of hexamethylenetetramine the mass is mixed and used for injection molding. The amount of hexamethylenetetramine depends on the quality of the resin and the desired properties of the molded article.

Although specific examples of the invention are described herein, it is to be understood that the invention is not limited to those precise examples which are merely illustrative.

What is claimed is:

1. The method of preparing an injection molding mass comprising the steps of:
   a. admixing a mixture consisting essentially of a thermosetting resin selected from the group consisting of polyester resins and epoxy resins in the liquid state and approximately 80–100 percent by weight of the resin of a particulate filler material with a specific gravity from about 2.1 to about 2.8 and with a particle size ranging from about 5 to about 50 microns;
   b. admixing with said resin and filler, from about 30 to 35 percent by weight of resin of glass fibers, each of said fibers having a diameter of from about 0.01 mm to about 0.02 mm and a length/diameter ratio from about 100 to about 500 thereby to form a mass consisting essentially of said resin, said filler and said fibers;
   c. mixing said mass in an open top mixing zone by means of a rotating ribbon conveyor, said conveyor being entirely covered by said mass;
   d. transporting the mass by means of the ribbon conveyor through a tubular outlet piece integral with the mixing chamber, said tubular outlet piece being of substantially uniform cross section and being capable of discharging about one-seventh to about one-fourth of said mass;
   e. discharging the about one-fourth to about one-seventh of the mass held in the tubular outlet piece;
   f. recycling the about one-fourth to about one-seventh of the mass discharged;
   g. continuing the mixing in the mixing zone until the mass has an average density of at least 1.3 and at least 80 percent of all fibers are individual fibers; and
   h. wherein the temperature throughout the mass during mixing is at all times below about 50° C. thereby maintaining the mass in a substantially unreacted condition.

2. Method according to claim 1 wherein mixing is continued until the mass has an average density of 1.5.

* * * * *